United States Patent [19]
Moore

[11] 3,896,225
[45] July 22, 1975

[54] HYDROCARBYL SULFENYLMERCAPTO PYRIMIDINES USED AS PESTICIDES

[75] Inventor: Joseph E. Moore, Richmond, Calif.

[73] Assignee: Chevron Research Company, San Francisco, Calif.

[22] Filed: Apr. 17, 1974

[21] Appl. No.: 461,578

Related U.S. Application Data

[62] Division of Ser. No. 201,185, Nov. 22, 1971, Pat. No. 3,821,222.

[52] U.S. Cl. .............................................. 424/251
[51] Int. Cl.² ........................ A01N 9/00; A01n 9/22
[58] Field of Search ............... 424/251; 260/256.5 R

[56] References Cited
UNITED STATES PATENTS
2,839,446   6/1958   Margot et al. .................. 260/251 R

*Primary Examiner*—Stanley J. Friedman
*Assistant Examiner*—Douglas W. Robinson
*Attorney, Agent, or Firm*—J. A. Buchanan, Jr.; John Stoner, Jr.; Raymond Owyang

[57] ABSTRACT

Compounds of the formula

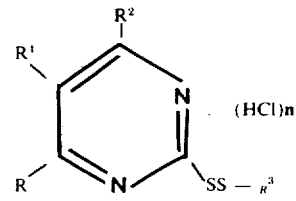

wherein R, $R^1$ and $R^2$ are hydrogen, halogen, hydroxyl, alkyl or alkenyl optionally substituted with halogen atoms and $R^3$ is an aliphatic hydrocarbyl group or an aryl group or

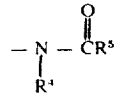

wherein $R^4$ is hydrogen or alkyl and $R^5$ is hydrogen, alkyl, alkenyl or phenyl optionally substituted with halogen atoms, and *n* is 0 or 1, possess fungicidal and insecticidal activity.

10 Claims, No Drawings

HYDROCARBYL SULFENYLMERCAPTO PYRIMIDINES USED AS PESTICIDES

This is a division of application Ser. No. 201,185, filed Nov. 22, 1971 now U.S. Pat. No. 3,821,222.

BACKGROUND OF THE INVENTION

1. Field

The present invention is directed to hydrocarbyl sulfenylmercapto pyrimidines and their use as fungicides and juvenile hormone mimetic insecticides.

2. Prior Art

U.S. Pat. No. 2,839,446 discloses certain pyrimidine derivatives, particularly trichloromethyl sulfenylmercapto pyrimidines and their use in the control of fungi.

DESCRIPTION OF THE INVENTION

The present invention is directed to certain novel pyrimidine compounds and the use of certain pyrimidine compounds for the control of fungi and insects. Certain of the pyrimidines mimic the activity of juvenile hormone.

The novel compounds of the present invention can be represented by the general formula

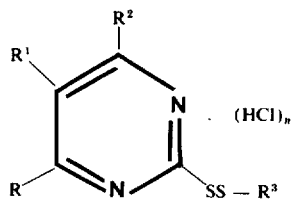

wherein R, $R^1$ and $R^2$ are individually hydrogen, halogen of atomic number 9 to 35 (fluorine, chlorine or bromine), hydroxy, alkyl of 1 to 6 carbon atoms substituted with 0 to 4 halogen atoms of atomic number 9 to 35 or alkenyl of 2 to 6 carbon atoms substituted with 0 to 4 halogen atoms of atomic number 9 to 35, $R^3$ is an aliphatic hydrocarbyl group (i.e., alkyl or alkenyl) of 2 to 10 carbon atoms substituted with 1 to 5 halogen atoms of atomic number 9 to 35, aryl of 6 to 12 carbon atoms substituted with 0 to 2 halogen atoms of atomic number 9 to 35 or alkyl groups of 1 to 4 carbon atoms, or

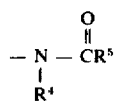

wherein $R^4$ is hydrogen or alkyl of 1 to 4 carbon atoms and $R^5$ is hydrogen, alkyl of 1 to 4 carbon atoms, alkenyl of 2 to 4 carbon atoms or phenyl substituted with 0 to 2 halogen atoms of atomic number 9 to 35, and $n$ is 0 or 1.

Preferably $R^1$ is hydrogen, R and $R^2$ are, individually, hydrogen, hydroxy or alkyl of 1 to 4 carbon atoms and $R^3$ is alkyl of 2 to 4 carbon atoms substituted with 1 to 5 halogen atoms of atomic number 9 to 35, particularly chlorine, or phenyl substituted with 0 to 2 halogen atoms of atomic number 9 to 35, particularly chlorine, or

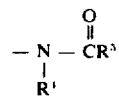

wherein $R^4$ is alkyl of 1 to 4 carbon atoms and $R^5$ is hydrogen. More preferably, R is hydrogen or methyl, $R^1$ is hydrogen, $R^2$ is hydrogen, hydroxy or alkyl of 1 to 3 carbon atoms and $R^3$ is alkyl of 2 to 4 carbon atoms substituted with 2 to 5 chlorine atoms or phenyl substituted with 1 to 2 chlorine atoms. The most preferred $R^3$ groups are the tetrachloroethyl, 1,1-diemthyl-2,2-dichloroethyl, p-chlorophenyl or

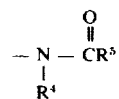

wherein $R^4$ is ethyl and $R^5$ is hydrogen.

The above novel compounds are useful in the control of fungi. Also, the above novel compounds are useful insecticides. In fact, the compounds described above possess juvenile hormone mimetic activity. In particular the compounds wherein $R^3$ is an aliphatic hydrocarbyl group of 1 to 10 carbon atoms substituted with 1 to 5 halogen atoms of atomic number 9 to 35 possess juvenile hormone mimetic activity. Thus compounds wherein $R^3$ is methyl substituted with halogen atoms also have juvenile hormone mimetic activity.

Representative compounds which R, $R^1$, and $R^2$ may represent are hydrogen, fluorine, chlorine, bromine, hydroxyl, methyl, ethyl, n-propyl, isopropyl, n-butyl, sec-butyl, t-butyl, pentyl, hexyl, allyl, crotyl, 2-propenyl, chloromethyl, trichloromethyl, bromomethyl, 2-fluoroethyl, etc.

Preferably the representative groups for R, $R^1$ and $R^2$ will be hydrogen, hydroxy, methyl, ethyl, propyl and butyl.

Representative groups which $R^3$ may represent include 1-chloroethyl, 1,1-dichloroethyl, 1,1,2-trichloroethyl, 2,2,2-trichloroethyl, 1,1,2,2-tetrachloroethyl, 1,2,2,2-tetrachloroethyl, pentachloroethyl, trichlorovinyl, 1,1-dimethyl-2,2,2-trichloroethyl, 1,1-dimethyl-2,2-dichloroethyl, 1,1,2,2-tetrachloropropyl, 1,2,3-trichloropropyl, 1,1-difluoroethyl, 1,1,2-tribromoethyl, 1-bromo-2-chloroethyl, 1,1-dichlorohexyl, phenyl, naphthyl, 4-chlorophenyl, 2-chlorophenyl, 2,4-dichlorophenyl, 3,4-dichlorophenyl, 2-bromophenyl, 3-fluorophenyl, 2-methyl-4-chlorophenyl, 4-butylphenyl, etc.

Representative groups which $R^4$ may represent include methyl, ethyl, n-propyl, isopropyl, n-butyl, t-butyl, etc.

Representative groups which $R^5$ may represent include hydrogen, methyl, ethyl, propyl, butyl, allyl, vinyl, phenyl, o-chlorophenyl, o,p-difluorophenyl, etc.

When the compounds are used as insecticides, $R^3$ may also represent chloromethyl, dichloromethyl, trichloromethyl, bromochloromethyl, trifluoromethyl, dibromomethyl, etc.

Typical compounds of the present invention include the following: 2-(1,1,2,2-tetrachloroethylsulfenylmercapto)-4-methyl pyrimidine, 2-(1,1,2,2-tetrachloroethylsulfenylmercapto)-4-chloromethyl-6-hydroxy pyrimidine, 2-(1,1,2,2-tetrachloroethylsulfenylmercapto)-4,6-dimethyl pyrimidine, 2-(1,1,2,2-tetrachloroethylsulfenylmercapto)-4-chloro pyrimidine, 2-(1,1,2,2-tetrachloroethylsulfenylmercapto)-4,5,6-trimethyl pyrimidine, 2-(1,1,2,2-tetrachloroethylsulfenylmercapto)-4-hydroxy pyrimidine, 2-(1,1,2,2-tetrachloroethylsulfenylmercaptol-4-hydroxy-6-methyl pyrimidine, 2-(1,1,2,2-tetrachloroethylsulfenylmercapto)-4-ethyl-6-methyl pyrimidine, 2-(1,1,2,2-tetrachloroethylsulfenylmercapto)-4-allyl pyrimidine, 2-(1,1,2,2-tetrachloroethylsulfenylmercapto)-4-hydroxy-6-ethyl pyrimidine, 2-(1,1,2,2-tetrachloroethylsulfenylmercapto)-4-hydroxy-6-n-butyl pyrimidine, 2-(1,1,2,2-tetrachloroethylsulfenylmercapto)-4-methyl-6-crotyl pyrimidine, 2-(1,1,2,2-tetrachloroethylsulfenylmercapto)-4-propyl pyrimidine, 2-(1,1,2-trichloroethylsulfenylmercapto)-4-methyl pyrimidine, 2-(1,2,2,2-tetrachloroethylsulfenylmercapto)-4-methyl-6-hydroxy pyrimidine, 2-pentachloroethylsulfenylmercapto-4-methyl pyrimidine, 2-(1,1-dibromo-2,2-dichloroethylsulfenylmercapto)-4-hydroxy-6-methyl pyrimidine, 2-trichlorovinylsulfenylmercapto-4,6-dimethyl pyrimidine, 2-(1,2-dichlorovinylsulfenylmercapto)-4,6-diethyl pyrimidine, 2-(1,1,2,2-tetrachloropropylsulfenylmercapto)-4-hydroxy pyrimidine, 2-(1,2,3-trichloropropylsulfenylmercapto) pyrimidine, 2-(1,2,3-trichloropropylsulfenylmercapto)-6-ethyl pyrimidine, 2-pentachloroethylsulfenylmercapto-4-methyl-6-isopropyl pyrimidine, 2-(1,1-dimethyl-2,2-dichloroethylsulfenylmercapto)-4-propyl pyrimidine, 2-(1,1-dimethyl-2,2,-dichloroethylsulfenylmercapto)-4-hydroxy-6-methyl pyrimidine, 2-(1,1-dimethyl-2,2-dibromoethylsulfenylmercapto)-4-butyl pyrimidine, 2-(1,1,2,2-tetrachloroethylsulfenylmercapto) pyrimidine, 2-(phenylsulfenylmercapto)- 4,5-dimethyl pyrimidine, 2-(4-chlorophenylsulfenylmercapto)-4-methyl-6-hydroxy pyrimidine, 2-(4-chlorophenylsulfenylmercapto)-4-ethyl pyrimidine, 2-(4-chlorophenylsulfenylmercapto)-6-hydroxy pyrimidine, 2-(4-chlorophenylsulfenylmercapto)-4,5,6-trimethyl pyrimidine, 2-(4-chlorophenylsulfenylmercapto)-4-allyl pyrimidine, 2-(3,4-dichlorophenylsulfenylmercapto)-4-methyl-6-hydroxy pyrimidine, 2-(3-methylphenylsulfenylmercapto)-4-hydroxy-6-methyl pyrimidine, 2-(2-fluoro-4-chlorophenylsulfenylmercapto)-4-methyl pyrimidine, 2-(2-methyl-4-chlorophenylsulfenylmercapto)-4-hydroxy pyrimidine, 2-trichloromethylsulfenylmercapto)-4-hydroxy-6-methyl pyrimidine, N-ethyl-N-(4,6-dimethylpyrimido-2-sulfenylmercapto) formamide, N-methyl-N-(4-hydroxy-6-methylpyrimido-2-sulfenylmercapto) formamide, N-propyl-N-(4-ethyl-6-vinylpyrimido-2-sulfenylmercapto) formamide, N-ethyl-N-(4,6-dimethylpyrimido-2-sulfenylmercapto) acetamide, N-methyl-N-(4-hydroxy-6-chloropyrimido-2-sulfenylmercapto) benzamide, etc.

The hydrochlorides of the above-named compounds are also included.

The compounds of this invention are prepared by the reaction of a halogenated hydrocarbyl sulfenylchloride or an amido sulfenylchloride and an appropriate 2-mercapto pyrimidine or 2-mercapto pyrimidine hydrochloride. The reaction may be written as follows:

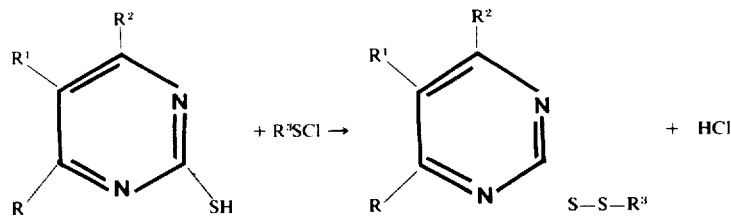

wherein R, R¹, R² and R³ are as previously defined. When the 2-mercapto pyrimidine starting material is the hydrochloride salt two moles of hydrogen chloride are released during the reaction.

The reaction is usually carried out in a solvent. The reaction involving 2-mercapto pyrimidine may be carried out in dichloromethane, chloroform, benzene, xylene, ethyl acetate or a liquid carboxylic acid. The reaction involving a 2-mercapto pyrimidine hydrochloride is preferably carried out in acetic acid as the solvent. The quantity of solvent is not critical and generally varies in weight from 5 to 50 times the weight of the pyrimidine compound. Usually the pyrimidine compound is dissolved or slurried in the solvent, and then unsolvated halogenated hydrocarbyl sulfenylchloride in an amount at least equal in moles to the pyrimidine is added rapidly. The reaction temperature may vary from 20° to 100°C. In order to completely remove the byproduct hydrogen chloride, a temperature of 70° to 100°C. is preferred. When a hydrochloride product is desired, the reaction temperature is kept lower, e.g., below 80°C. The time of reaction is dependent upon the temperature and the nature of the reactants; however, reaction is continued until all of the insoluble starting material has disappeared. Usually the reaction is complete in from 0.1 to 10 hours, more often 0.5 to 1 hour.

The product is recovered from the reaction mixture by filtering hot and then evaporating off the solvent. The resulting crude product may be used as is, or it may be purified by crystallization or by chromatography. Crystallization is readily accomplished by cooling a solution of the crude product. Solvents for crystallization are preferably mixtures of aromatic hydrocarbons such as benzene, toluene, etc. with an aliphatic hydrocarbon such as pentane, hexane, etc. The ratio of the two may vary from 1:2 to 2:1 by volume.

The compounds of this invention may also be prepared by the process of U.S. Pat. No. 2,839,446, which is concerned with the 2-trichloromethyl sulfenylmercapto pyrimidines.

The subject invention can be more fully understood by reference to the following examples. Unless otherwise indicated percentages are by weight.

EXAMPLE 1

Preparation of
2-(1,1,2,2-tetrachloroethylsulfenylmercapto)-4-methyl pyrimidine

A suspension was prepared by mixing 3.4 g. (0.02 mole) 2-mercapto-4-methyl pyrimidine hydrochloride in 100 ml. of acetic acid. Then 5.0 g. (0.02 mole) of tetrachloroethylsulfenylchloride was added to this suspension all at once. The resulting mixture was stirred at the reflux temperature for 3 minutes. At the end of this time the reaction mixture was filtered while hot. The filtrate was evaporated to 10 ml. by volume. This material was then diluted with 100 ml. of benzene and 75 ml. of hexane and cooled to 0°C. The precipitate was removed by filtration and discarded. The filtrate was evaporated to give a liquid which crystallized upon standing. The crystals were separated by filtration and after drying weighed 3.3 g. The product, 2-(1,1,2,2-tetrachloroethylsulfenylmercapto)-4-methyl pyrimidine, had a melting point of 54°–56°C. Analysis was as follows:

To a slurry of 5.0 g. (0.029 mole) of 2-mercapto-4-hydroxy-6-propyl pyrimidine in 50 ml. of 1,2-dimethoxyethane, was added 6.9 g. (0.029 mole) of 1,-1,2,2-tetrachloroethylsulfenylchloride. The resulting mixture was heated at the reflux temperature for ten minutes, and then filtered while still hot. The solvent was removed by evaporation under reduced pressure to give 8.8 g. of 2-(1,1,2,2-tetrachloroethylsulfenylmercapto)-4-hydroxy-6-propyl pyrimidine hydrochloride having a melting point of 142°–144°C. Analysis was as follows:

|   |   | Calculated | Found |
|---|---|---|---|
| Cl | % | 43.8 | 43.0 |
| S  | % | 15.8 | 15.5 |

Infrared analysis showed strong adsorption bands at 6.15, 6.35, 6.75, 7.2, 7.65, 11.7, 12.4 and 13.3 microns.

Other compounds of the present invention were made by similar reactions. These are listed in Table I.

TABLE I

| Compound | Elemental Analysis - % | | | | | | Melting Point °C. |
|---|---|---|---|---|---|---|---|
|  | Calculated | | | Found | | |  |
|  | Cl | N | S | Cl | N | S |  |
| 2-(4-chlorophenylsulfenylmercapto)-4-methyl pyrimidine | 13.2 | — | 23.8 | 14.4 | — | 23.1 | 80–82 |
| 2-(1,2,2,2-tetrachloroethylsulfenylmercapto) pyrimidine | 45.7 | — | 20.1 | 45.4 | — | 20.5 | 50–51 |
| 2-(1,1,2,2-tetrachloroethylsulfenylmercapto) pyrimidine | 45.7 | — | 20.1 | 46.3 | — | 20.5 | 89–90 |
| 2-(1,1,2,2-tetrachloroethylsulfenylmercapto)-4,6-dimethyl pyrimidine | — | 8.3 | — | — | 7.6 | — | 53–54 |
| 2-(1,1-dimethyl-2,2-dichloroethylsulfenylmercapto)-6-hydroxy pyrimidine hydrochloride | 33.1 | — | 20.0 | 29.6 | — | 19.4 | 200(dec) |
| 2-(1,1-dimethyl-2,2-dichloroethylsulfenylmercapto)-4,6-dimethyl pyrimidine | 23.9 | — | 21.6 | 24.4 | — | 21.6 | 82.5–83.5 |
| 2-(1,1-dimethyl-2,2-dichloroethylsulfenylmercapto)-4-propyl-6-hydroxy pyrimidine hydrochloride | 17.6 | — | 29.6 | 17.5 | — | 29.3 | 144–171 (dec) |
| 2-(1,1,2,2-tetrachloroethylsulfenylmercapto)-6-hydroxy pyrimidine hydrochloride | 48.9 | — | 17.7 | 47.1 | — | 17.0 | 116–126 |
| 2-(1,2,2,2-tetrachloroethylsulfenylmercapto)-4-methyl pyrimidine | 43.77 | — | 19.79 | 43.60 | — | 18.65 | Oil |
| 2-(1,1-dimethyl-2,2-dichlorosulfenylmercapto)-4-methyl pyrimidine | 25.04 | — | 22.64 | 26.75 | — | 21.48 | Oil |
| N-ethyl-N-4,6-dimethylpyrimido-2-sulfenylmercapto) formamide | — | 17.3 | 26.4 | — | — | — | Oil |

|   |   | Calculated | Found |
|---|---|---|---|
| Cl | % | 43.8 | 43.2 |
| S  | % | 19.8 | 18.0 |

The infrared spectra had strong adsorption bands at 6.35, 6.8, 7.5, 8.3, 12.0, 12.45, 13.2 and 14.05 microns.

EXAMPLE 2

Preparation of
2-(1,1,2,2-tetrachloroethylsulfenylmercapto)-4-hydroxy-6-propyl pyrimidine hydrochloride

UTILITY

The novel compounds of the present invention exhibit fungicidal activity against a variety of fungi. The following examples indicate the fungicidal activity.

Example A

The inventive compounds were evaluated for fungicidal effectiveness by means of the mycelial drop test. This test is designed to measure the fungitoxic activity of fungicidal chemicals in terms of their degree of inhibition on mycelium growth. Each compound to be tested was dissolved in acetone to 250 ppm concentration. Paper discs previously inoculated with equal amounts of particular fungus mycelium were placed on potato dextrose agar medium. The paper discs were treated by applying a precise and equal volume of each of these fungicidal solutions to the center. Following treatment with the fungitoxic chemical, the discs were incubated along with inoculated but untreated control discs at ambient temperatures until such time that the mycelial growth away from the edge of the untreated control discs reached a certain distance. From this comparison a percent inhibition of growth area was determined. The results of these tests for various compounds of this invention on the particular fungus mycelium are indicated in Table II.

TABLE III

| Compound | Monilinia fructicola | Alternaria solani |
|---|---|---|
| 2-(1,1,2,2-tetrachloroethylsulfenyl-mercapto)-4-methyl pyrimidine | 100 | 100 |
| 2-(1,1,2,2-tetrachloroethylsulfenyl-mercapto)-4-hydroxy-6-propyl pyrimidine hydrochloride | 100 | — |
| 2-(4-chlorophenyldithio)-4-methyl pyrimidine | 100 | 100 |
| 2-(1,2,2,2-tetrachloroethylsulfenyl-mercapto) pyrimidine | 100 | 100 |

TABLE II

| Compound | % Control Pythium ultimum | Helminthosporium sativum | Fusarium oxysporum | Rhizoctonia solani |
|---|---|---|---|---|
| 2-(1,1,2,2-tetrachloroethylsulfenyl-mercapto)-4-methyl pyrimidine | 96 | 98 | 78 | 100 |
| 2-(1,1,2,2-tetrachloroethylsulfenyl-mercapto)-4-hydroxy-6-propyl pyrimidine hydrochloride | — | — | — | 100 |
| 2-(1,2,2,2-tetrachloroethylsulfenyl-mercapto) pyrimidine | — | 78 | — | — |
| 2-(1,1,2,2-tetrachloroethylsulfenyl-mercapto) pyrimidine | 100 | 99 | 99 | 100 |
| 2-(1,1,2,2-tetrachloroethylsulfenyl-mercapto)-4,6-dimethyl pyrimidine | 100 | 99 | — | 100 |
| 2-(1,1-dimethyl-2,2-dichloroethyl-sulfenylmercapto)-4,6-dimethyl pyrimidine | — | — | — | 90 |
| 2-(1,1-dimethyl-2,2-dichloroethyl sulfenylmercapto)-4-propyl-6-hydroxy pyrimidine hydrochloride | — | — | — | 85 |
| 2-(1,2,2,2-tetrachloroethylsulfenyl-mercapto)-4-methyl pyrimidine | — | — | — | 78 |
| N-methyl-N-(4,6-dimethylpyrimido-2-sulfenylmercapto) formamide | 78 | — | — | 70 |
| 2-(1,1,2,2-tetrachloroethylsulfenyl-mercapto)-6-hydroxy pyrimidine hydrochloride | 100 | 90 | — | 70 |

Example B

A number of the compounds were also treated for effectiveness against spores by means of a variation of "The Standard Spore Slide-Germination Method for Determining Fungicidal Activity," described in the *American Phytopathological Society Journal*, Volume 33, pages 627–632 (1943). The method is designed to measure the fungitoxic activity of fungicidal chemicals, their activity being expressed in terms of percent inhibition of germination of fungus spores. Each compound toxicant to be tested was dissolved in acetone to a concentration of 100 ppm. These solutions were then pipetted into the wells of depression slides and allowed to dry. The wells were filled with a spore suspension of the specified test organism. A 10-fold greater volume of suspension was used than that used to apply the toxicant so that the slide concentration of toxicant was 10 ppm. The spores were then incubated in a moist chamber overnight. A group of 100 spores was examined and the number of spores germinated and not germinated was counted and recorded to show the biological activity in terms of the percent germination inhibition. Table III reports the results of this testing.

| | | |
|---|---|---|
| 2-(1,1,2,2-tetrachloroethylsulfenyl-mercapto) pyrimidine | 100 | 100 |
| 2-(1,1,2,2-tetrachloroethylsulfenyl-mercapto)-4,6-dimethylpyrimidine | 100 | 100 |
| 2-(1,1,2,2-tetrachloroethylsulfenyl-mercapto)-6-hydroxy pyrimidine hydrochloride | 61 | — |
| 2-(1,2,2,2-tetrachloroethylsulfenyl-mercapto)-4-methyl pyrimidine | 100 | — |
| 2-(1,1-dimethyl-2,2-dichloroethyl-sulfenylmercapto)-4-methyl pyrimidine | 100 | — |
| N-methyl-N-(4,6-dimethylpyrimido-2-sulfenylmercapto) formamide | 100 | 100 |

When used as fungicides the compounds of this invention will be formulated and applied in fungicidal amounts by conventional art methods to fungi or hosts which are subject to fungus attack, especially vegetative hosts such as plants, plant seeds, etc. The amount used will, of course, depend upon several factors such as the host, the type of fungus, the particular compound, etc. The amount generally will range from 2 to 90%. The compounds may be combined with inert liquids or solid carriers as powders, solutions, dispersions, etc. for such use.

The compounds of this invention will generally be admixed with biologically inert liquids or solids in an amount of from about 0.005 to 95 weight percent. Higher or lower amounts can be used to advantage. Preferably from 1 to 50 weight percent of the composition will be the compound. Typical of the liquid carrier which may be admixed with the compounds of this invention include, in addition to acetone, such liquids as water, kerosene, xylene, alcohols, alkylated naphthylene and glycols. Typical solids which may be incorporated with the compounds include the natural clays, such as kaolin clays, diatomaceous earth, synthetic fine silica, talc, pyrophyllite, etc.

Fungicidal formulations may also contain stabilizers, spreading agents, sticking agents, fillers, other compatible pesticides and the like.

The compounds of the present invention also exhibit insecticidal activity, particularly juvenile hormone mimetic activity. The following tests were conducted to show the juvenile hormone activity.

Example C

To show the insecticidal activity of the subject compounds, particularly the juvenile hormone mimetic activity, several different pests in a preadult stage of development were contacted with a solution of the test compound. The treated insects were then observed as to the compounds' effect upon the development of the succeeding stages (juvenilization), including egg laying and egg hatching to give a new generation. Mortality readings were taken.

Tests were carried out on the following pests: Dock Beetle (*Gastrophysa cyanes*), Cabbage Looper (*Trichoplusia ni*) and Yellow Fever Mosquito (*Aedes aegypti*).

For the Dock Beetle test, an acetone solution containing 20 micrograms in 1 microliter of solution was topically applied to the abdomen of a late fifth stage (last stage) larva. Usually 10 to 20, preferably 20, larvae were treated. Following treatment the larvae were kept in an incubator until the adult emerged (or attempted to emerge). At this time a count was made of the dead pupae. The live specimens were examined under a microscope for juvenilization. The number of juvenile adults per total number tested was recorded, and is given in Table IV as percent juvenilization. Also the degree of juvenilization was measured based on the following:

0 = normal appearing adult
1 = crumpled elytra in the adult
2 = 1/2 pupa — 1/2 adult
3 = supernumery pupa
4 = 1/2 larva — 1/2 pupa Percent control, defined as the percentage of treated insects which failed to perpetuate themselves, was also measured. In determining percent control, account was made of treated insects that failed to reach adulthood for one reason or another, plus those that failed to lay eggs, or that layed sterile eggs.

For the Cabbage Looper, an acetone solution containing 100 micrograms of the test compound in 5 microliters of solution was applied topically to the entire length of the body of a late fifth stage larva. Normally 10 larvae were treated per test. The treated larvae were then fed until they pupated. The pupae were examined under a microscope, checking for any larvae characteristics in the pupae (juvenilization). Percent juvenilization as well as mortality readings were made. The pupae were incubated until the adult (if any) emerged. These adults were then checked as to egg laying and percent laying fertile eggs. Mortality of the adults was determined. Juvenilization, degree of juvenilization and percent control were determined. The degree of juvenilization was measured based on the following:

0 = normal appearing pupa
1 = 1/2 larva — 1/2 pupa; no prolegs; pupoid thorax
2 = 1/2 larva — 1/2 pupa; prolegs; pupoid thorax
3 = supernumery larva For the Yellow Fever Mosquito, late fourth stage larvae of the mosquitos were placed in a cup containing 30 ml. of deionized water having 6 ppm of the test material dissolved therein. About 20 larvae were used per test. The larvae were fed and allowed to pupate. The pupae were examined under a microscope for retention of larvae characteristics (juvenilization). The live pupae were kept until the adult mosquito emerged, mated and layed eggs. The percent fertile eggs was determined. A count was made at each stage for mortality, i.e. larvae, pupae and adult.

The results of the tests are tabulated in Table IV.

TABLE IV

| Compound | Dock Beetle | | | Cabbage Looper | | | Yellow Fever Mosquito | | |
|---|---|---|---|---|---|---|---|---|---|
| | Conc. ($\mu$g/ insect) | Juvenilization % (Degree) | % Control (1) | Conc. ($\mu$g/ insect) | Juvenilization % (Degree) | % Control (1) | Conc. (ppm) | Juvenilization % (Degree) | % Control (1) |
| 2-(1,1,2,2-tetrachloro-ethylsulfenylmercapto)-4-methyl pyrimidine | 50 | 80 (4) | 95 | 10 | 30 (1.6) | 100 | 6.6 | 0 (0) | 100 |
| 2-(1,1,2,2-tetrachloro-ethylsulfenylmercapto)-4-hydroxy-6-propyl pyrimidine hydrochloride | 100 | 0 (—) | 70 | — | — | — | — | — | — |
| 2-(1,2,2,2-tetrachloro-ethylsulfenylmercapto) pyrimidine | — | — | — | 100 | 20 (1) | 100 | — | — | — |
| 2-(1,1,2,2-tetrachloro-ethylsulfenylmercapto) pyrimidine | — | — | — | 100 | 80 (1) | 80 | — | — | — |
| 2-(1,1,2,2-tetrachloro-ethylsulfenylmercapto)-4,6-dimethyl pyrimidine | 20 | — | 60 | 30 | 100 (1.5) | 100 | 15 | 0 (—) | 90 |
| 2-(1,1-dimethyl-2,2-dichloroethylsulfenyl-mercapto)-4,6-dimethyl pyrimidine | 20 | — | 50 | 250 | — | 30 | — | — | — |

TABLE IV – Continued

| Compound | Dock Beetle | | | Cabbage Looper | | | Yellow Fever Mosquito | | |
|---|---|---|---|---|---|---|---|---|---|
| | Conc. (μg/insect) | Juvenilization % (Degree) | % Control (1) | Conc. (μg/insect) | Juvenilization % (Degree) | % Control (1) | Conc. (ppm) | Juvenilization % (Degree) | % Control (1) |
| 2-(1,1,2,2-tetrachloro-ethylsulfenylmercapto)-6-hydroxy pyrimidine hydrochloride | 20 | 10 (2) | 100 | — | — | — | — | — | — |
| 2-(1,2,2,2-tetrachloro-ethylsulfenylmercapto)-4-methyl pyrimidine | — | — | — | 100 | 20 (1) | 40 | — | — | — |
| N-methyl-N-(4,6-dimethylpyrimido-2-sulfenylmercapto) formamide | 20 | 0 (—) | 90 | 100 | 60 (1) | 100 | — | — | — |
| 2-(trichloromethyl-sulfenylmercapto)-4-methyl pyrimidine | — | — | — | 30 | 50 (1) | 50 | — | — | — |

(1) Percent control refers to the percentage of treated insects that failed to reach adulthood for any reason, plus those that failed to lay eggs, plus those that layed sterile eggs; in effect, the percent treated insects that failed to perpetuate themselves.

When used as an insecticide the compounds may be applied in either liquid or solid formulations to the insects, their environment or hosts susceptible to insect attack. For example, they may be sprayed or otherwise applied directly to plants or soil so as to effect control of insects coming into contact therewith.

Formulations of the compounds of this invention will comprise a toxic amount of one or more of the compounds and a biologically inert carrier. Usually they will also contain a wetting agent. Solid carriers such as clay, talc, sawdust and the like may be used in such formulations. Liquid diluents which may be used with these compounds include water and aromatic solvents. In addition these formulations may contain other compatible pesticides, fillers, stabilizers, attractants and the like.

The concentration of the active ingredient to be used with inert carriers, either solid or liquid carriers, will be dependent upon many factors, such as the particular compound which is used, the carrier in or upon which it is incorporated, the method and conditions of application, the insect species to be controlled, etc., the proper consideration of these factors being within the skill of those versed in the art. In general, the toxic ingredients of this invention will be effective in concentrations from about 0.0001 percent by weight to as high as 50 percent by weight or higher. Economically, of course, it is desirable to use lower concentrations of this active ingredient. Thus, it is usually desirable to use less than 20 percent by weight of the active ingredient in a particular composition.

The terms "insecticide" and "insect" as used herein refer to their broad and commonly understood usage rather than to those creatures which in the strict biological sense are classified as insects. Thus, the term insect is used not only to include small invertebrate animals belonging to the class Insecta but also to other related classes of arthropods whose members are segmented invertebrates having more or fewer than six legs, such as spiders, mites, ticks, centipedes, worms and the like.

As will be evident to those skilled in the art, various modifications on this invention can be made or followed, in the light of the foregoing disclosure and discussion, without departing from the spirit or scope of the disclosure or from the scope of the following claims.

I claim:

1. A method for controlling fungi which comprises applying to said fungi or its habitat a fungicidally effective amount of the compound of the formula

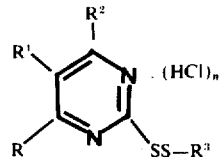

wherein $R^1$ is hydrogen, R and $R^2$ are individually hydrogen, hydroxy or alkyl of 1 to 4 carbon atoms, and $R^3$ is

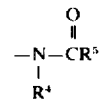

wherein $R^4$ is hydrogen or alkyl of 1 to 4 carbon atoms and $R^5$ is hydrogen, alkyl of 1 to 4 carbon atoms, alkenyl of 2 to 4 carbon atoms or phenyl substituted with 0 to 2 halogen atoms of atomic number 9 to 35, and n is 0 or 1.

2. The method of claim 1 wherein $R^4$ is alkyl of 1 to 4 carbon atoms and $R^5$ is hydrogen or alkyl of 1 to 4 carbon atoms.

3. The method of claim 2 wherein R is hydrogen or methyl, $R^2$ is hydrogen, hydroxy or alkyl of 1 to 3 carbon atoms, $R^4$ is ethyl and $R^5$ is hydrogen.

4. The method of claim 2 wherein $R^5$ is hydrogen and n is 0.

5. The method of claim 4 wherein the compound is N-ethyl-N-(4,6-dimethylpyrimido-2-sulfenylmercapto)formamide.

6. A fungicidal composition comprising a fungicidally effective amount of the compound of claim 1 and a biologically inert carrier.

7. The fungicidal composition of claim 6 wherein $R^4$ is alkyl of 1 to 4 carbon atoms and $R^5$ is hydrogen or alkyl of 1 to 4 carbon atoms.

8. The fungicidal composition of claim 7 wherein R is hydrogen or methyl, $R^2$ is hydrogen, hydroxy or alkyl of 1 to 3 carbon atoms, $R^4$ is ethyl and $R^5$ is hydrogen.

9. The fungicidal composition of claim 7 wherein $R^5$ is hydrogen and n is 0.

10. The fungicidal composition of claim 9 wherein the compound is N-ethyl-N-(4,6-dimethylpyrimido-2-sulfenylmercapto)formamide.

* * * * *